United States Patent [19]

Chaudhary

[11] 4,012,462

[45] Mar. 15, 1977

[54] HIGH IMPACT GRAFT COPOLYMERS

[75] Inventor: Sohan S. Chaudhary, Monroeville, Pa.

[73] Assignee: ARCO Polymers, Inc., Philadelphia, Pa.

[22] Filed: May 15, 1975

[21] Appl. No.: 577,803

[52] U.S. Cl. .................. 260/880 R; 260/878 R; 260/879

[51] Int. Cl.$^2$ .......................... C08L 9/06

[58] Field of Search .............. 260/879, 880 R

[56] References Cited

UNITED STATES PATENTS

| | | | |
|---|---|---|---|
| 3,428,712 | 2/1969 | Carrock | 260/880 R |
| 3,488,743 | 1/1970 | Baer | 260/880 R |
| 3,488,744 | 1/1970 | Nemphos | 260/880 R |
| 3,579,612 | 5/1971 | Lowell | 260/880 R |
| 3,781,383 | 12/1973 | Finestone | 260/880 R |
| 3,825,625 | 7/1974 | Kudo | 260/880 R |
| 3,883,616 | 5/1975 | Hozumi | 260/880 R |

Primary Examiner—Paul R. Michl
Attorney, Agent, or Firm—Lewis J. Young

[57] ABSTRACT

High impact polymer having broad rubber particle size distribution is prepared by a bulk-bulk-suspension three step polymerization process. A portion of a rubber-in-monomer solution is bulk polymerized to form a small average rubber particle size. The remaining portion of the same or a different rubber solution having the same or a different concentration is added to the system and stirred or polymerized until the desired distribution of rubber particle size is attained in the system. The system is then polymerized in suspension to form the desired high impact product.

7 Claims, No Drawings

HIGH IMPACT GRAFT COPOLYMERS

BACKGROUND OF THE INVENTION

This invention relates to a method for preparing high impact graft polymers, based on graft copolymers of one or more monomers on elastomers. More specifically, it concerns an improved method for the preparation of rubber-modified styrene polymers having a broad distribution of rubber particle size by a two step bulk polymerization followed by a suspension polymerization in aqueous medium.

It is known to prepare rubber-modified styrene polymers by a bulk-suspension process. In this process an elastomer is dissolved in styrene monomer, polymerized in bulk to 10–50 percent conversion, suspended in aqueous medium, and polymerized in suspension to complete conversion.

Among the many disadvantages of the above two step process are the high viscosity developed during the bulk polymerization step and the generally narrow particle size range of the rubber particles formed. Material with broad rubber particle size distribution has been made successfully by blending small particle size material with large particle size material. However, the blending technique has many drawbacks. In the first place it requires the preparation of two different feedstocks which need close monitoring. Also, whenever two different materials are blended together, there is always the possibility of incompatibility, poor mixing, wrong feed ratios, etc.

SUMMARY OF THE INVENTION

It has now been found that high impact graft copolymers having broad rubber particle size distribution can be prepared by a three step process comprising a two-step bulk polymerization and a final suspension polymerization. According to this process, a 50 to 85 percent portion of a rubber-in-monomers solution is polymerized in bulk at selected conditions to a high solids content. The reaction conditions are selected such that the prepolymer syrup has an average rubber particle size somewhat smaller than desired. At this point, the remaining 50 to 15 percent of the rubber-in-monomers solution is added to the system with stirring. This portion may or may not have a regulator in it and may have a different concentration of rubber. The new mix is stirred until the desired distribution of rubber particle size has been attained in the system. A further conversion may or may not be required at this stage of the reaction. After the desired morphology of the prepolymer is obtained, the syrup is suspended and polymerization is completed as ususal.

The late addition of fresh rubber solution of the same concentration results in a lowering of the viscosity of the prepolymer syrup. This lowering of the viscosity allows better mixing during the bulk steps, increases the average rubber particle size and particle size distribution, and facilitates the suspension step. The use of higher concentration of rubber-in-monomer in the solution at the second addition can give rise to copolymers having higher rubber concentrations. Lower viscosity at this point in the polymerization also allows one to obtain the higher molecular weight polymers in shorter times than in the two-step process. Further the method allows a broader distribution of rubber particle size to be obtained than can be obtained in the known two-step process.

DETAILED DESCRIPTION OF THE INVENTION

The method of the invention consists of three steps: the prepolymerization step A, prepolymerization step B, and a suspension polymerization step.

In prepolymerization step A, a solution of a rubbery polymer in a monomer liquid is polymerized in bulk, at temperatures between 70° and 130° C., with or without catalyst, to form a prepolymer mixture having an average rubber particle size of from 0.5 to 3.0 microns. Agitation is important to the final rubber particle size formed. However, since the exact rate of agitation needed to obtain a specific particle size depends on the size of the reactor, the type of agitator blade, the particular rubber used, the type and concentration of the modifier, the temperature of the reaction medium, and many other factors, no specific agitator speed can be specified. One skilled in the art, however, should have no difficulty arriving at a suitable set of conditions, given a knowledge of the characteristics of the particular apparatus and system being worked with. This solution is polymerized to about 15 to 40 percent conversion, preferably 20 to 30 percent conversion, of monomers to polymer. The initial rubber solution may contain up to 20% rubber depending on the concentration of rubber desired in the final polymer, the particular rubber chosen, and the monomers chosen. Concentrations of 5 to 15% rubber are preferred in order to keep the viscosity of the prepolymer system within workable limits.

In prepolymerization step B, the prepolymer syrup from step A is diluted with a second solution of a rubbery polymer in a monomer liquid. The addition causes the temperature of the system to decrease. The system is agitated, preferably at a rate slower than that used in step A, and heated at temperatures of from 85° to 110° C., preferably 90° to 105° C., for a time, such as 30 minutes, to ensure intimate mixing of the system and further polymerization, if desired, of the monomers to polymer having an average rubber particle size greater than that obtained in step A and having a broad range of particle sizes. Typically the average rubber particle size after this step will be 1.0 to 4.0 microns diameter with a maximum size of 5–15 microns in diameter. In the case where further polymerization is not necessary, the addition of the second portion of rubber-in-monomer solution cools the system enough to nearly stop further polymerization. As a consequence, heat transfer is not a concern, and agitation can be slowed to a much lower speed. This condition allows dispersion of the second portion of rubber solution as relatively large rubber particles.

The concentrations of rubber in monomer should be such that a total solids content of rubber and polymer of between 20 and 30 percent is obtained after the two prepolymerization steps.

In the suspension step, the prepolymer syrup from step B is suspended by known methods in water and polymerized in the presence of a suitable catalyst to complete conversion to form polymer particles of from 10 to 100 mesh, U.S. Standard Sieve, and having a broad range of rubber particle sizes. It should be noted that the graft polymer product from the suspension step is referred to as having a particle size of between 10 and 100 mesh, U.S. Standard Sieve. This particle size is not to be confused with the rubber particle size of the present invention which relates to the microscopic particle size of the rubber particles within the polymer matrix. This is the internal structure of the 10–100 mesh particles and is independent therefrom.

The average rubber particle sizes were determined by electron photomicrography. In this process, a dispersion of the polymer is prepared and an electron microphotograph is taken thereof. The actual particle sizes are measured and counted to give a number average particle size. In most cases, particles as small as 0.1 micron in diameter were found. Results are reported as number average rubber particle size, and the largest particle size found to exist in significant amounts in the microphotograph were reported as maximum diameters. Thus, a prepolymer reported as having an average rubber particle size of 2.0 microns with maximum diameter of 10 microns, should be assumed to have particles smaller than 0.5 microns in diameter and maximum particle diameters of 10 microns. This is not to say that a small number of particles may not have diameters greater than 10 microns or less than 0.5 microns. By range of rubber particle size is meant the spread between the number average rubber particle size diameter and the maximum particle diameter. Thus a "normal" prepolymer having an average rubber particle size of 2 microns with maximum diameters of about 4 microns has a range of 2 microns in diameter. A "broad" prepolymer having an average rubber particle size of 4 microns with maximum diameters of 15 microns has a range of about 11 microns. By "broad" range of rubber particle size is meant a range of from 3.8 to 9 microns, in diameter, compared to a "normal" range of from 1 to 2 microns in diameter.

After polymerization to complete conversion in the aqueous suspension step, the rubber-modified product is separated from the aqueous medium by acidification with dilute hydrochloric acid, centrifugation or filtration of the beads, washing with water, and drying the resultant polymer beads by usual methods.

In one embodiment of the present invention, a rubber solution is made up by dissolving 1 to 20 parts rubber per 99 to 80 parts of monomer liquid. The resulting solution may have added a free-radical producing catalyst, such as peroxide or high temperature azo catalyst, a molecular weight regulator such as t-dodecyl mercaptan, an antioxidant such as trinonyl phenyl phosphite, a plasticizer such as mineral oil, or any combination of these additives. A major portion of this rubber-in-monomer solution, for example a 50 to 85% portion, is then polymerized in bulk in the prepolymerization step A to about 15–40% conversion, preferably 20–30% conversion, to form a prepolymer with small rubber particle size. Then the remaining portion of the rubber-in-monomer solution is added to the system and heated under different conditions to ensure further mixing and a different, usually larger, rubber particle size. A further conversion may or may not be required during this prepolymerization step B. At this point, the system is suspended in water with the aid of a suspending agent, and polymerized in the presence of a free-radical producing catalyst to complete conversion. The product is a rubber-modified polymer having a wide range of rubber particle sizes.

In yet another embodiment of the present invention, prepolymerization step A utilizes one rubbery polymer solution. In prepolymerization step B, a different rubbery polymer solution, which may contain a different rubber than in step A or merely a different concentration of the same rubber, is added to form the prepolymer mixture. The final polymer is then formed by the usual suspension polymerization step.

The rubbery polymers suitable for use in the present process may be conjugated 1,3-diene rubbers, styrene-diene copolymer rubbers, acrylonitrile-diene copolymer rubbers, ethylene-propylene-diene terpolymer rubbers, acrylate-diene copolymer rubbers, and mixtures thereof.

Preferred rubbers are diene rubbers such as homopolymers of conjugated dienes such as butadiene, isoprene, chloroprene, and piperylene and copolymers of such dienes with up to 50 mole percent of one or more copolymerizable mono-ethylenically unsaturated monomers, such as styrene, substituted styrenes, acrylonitrile, methacrylonitrile and isobutylene. A preferred copolymer rubber is one consisting of 65 to 90 percent butadiene and 10 to 35 percent styrene.

The polymerizable ethylenically unsaturated monomer liquid may be a monovinylaromatic hydrocarbon such as styrene, nuclear methylstyrenes, ethylstyrene, isopropylstyrene, t-butylstyrene, chlorostyrene, dichlorostyrenes, and the like; unsaturated nitriles, such as acrylonitrile and methacrylonitrile; or acrylic monomers, such as acrylic acid, methacrylic acid, methyl acrylate, and methyl methacrylate. Mixtures of two or more of these copolymerizable monomers may be used alone or in admixture with alphamethylstyrene. Preferred mixtures will contain at least 50 percent of a monovinyl aromatic hydrocarbon.

Suitable catalysts for the prepolymerization and suspension steps are the free radical producing substances such as organic peroxides, hydroperoxides and the high temperature azo-type catalysts such as 1-tertiary butylazo-1-cyanocyclohexane. The catalysts are usually used in quantity from 0.0005 to 2 percent, although the preferred range is from 0.1 to 0.5 percent. The catalyst is used to accelerate polymerization in the suspension system and may, in some cases, be desirable to accelerate the prepolymerization steps. Especially useful catalysts are benzoyl peroxide, lauroyl peroxide, tertiary butyl peroxide, tertiary butyl perbenzoate, tertiary butyl peracetate, 1-tertiary butylazo-1-cyanocyclohexane, and mixtures of these.

Molecular weight regulators, such as mercaptans, may be added in amounts less than 2 percent, more usually less than 0.5 percent during either the prepolymerization step A or B or both.

Sometimes the polymerizable monomer contains, or has added thereto, a small quantity of an antioxidant such as an alkyl aryl phosphite such as tri nonyl phenyl phosphite, in quantity down to about 0.0001, and usually less than 0.50 percent for improved product stability.

The rubber-modified polymers prepared by the process of this invention have improved toughness, impact strength, flexibility, and are useful for most applications of high-impact resins. Further, the broad distribution of rubber particle size gives these products increased resistance to chemicals such as grease and oil.

The practice of the invention is further illustrated in but not limited to the following examples in which all parts are parts by weight.

EXAMPLE I

To a stirred, heated reactor was added 92.5 parts of styrene and 0.15 parts of trinonylphenyl phosphite antioxidant. The reactor was heated to 60°–70° C. under a blanket of nitrogen and 7.5 parts of a stereospecific polybutadiene rubber was added. The rubber was dissolved in the styrene by continued heating at 60°–70° C. with stirring. To this solution was added 0.10 parts of t-dodecyl mercaptan modifier. The solution was then stirred at 140 rpm at 112° C. for 7 hours until approximately 30% total solids had been formed in the solution. The average particle size of the rubber at this stage of the polymerization was determined to be about 1 micron with maximum particles of 3 microns in diameter. This partially polymerized mass was then suspended by adding, with agitation, into a mixture of 100 parts of deionized water, 0.44 parts of trisodium phosphate, 0.59 parts of calcium chloride, and 0.33 parts of sodium lauryl sulfate.

To this suspension was added 0.6 parts of mineral oil and 0.12 parts of t-butylperbenzoate as catalyst and the suspension was polymerized by heating for 1 hour up to 112° C., maintained at 112° C for 4 hours, heated to 125° C. for half an hour and maintained at 125° C. for 2–3 hours, until complete conversion of the monomer to polymer. The resultant graft copolymer of styrene on the butadiene rubber was isolated by acidifying with hydrochloric acid, washing with water and centrifuging. The wet beads were oven-dried at 60°–70° C. The dried beads had a bead particle size of between 20 and 60 mesh. The rubber particle size within the beads was again about 1 micron average with maximum particles of about 3 microns in diameter — a narrow range of 2 microns.

This example did not follow the method of the invention, but rather a known process similar to that of U.S. Pat. No. 3,047,534. The example illustrates that the known process produces graft polymer having a narrow distribution of rubber particle size in the polymer particles.

EXAMPLE II

Prepolymerization Step A

A solution of 7.5 parts of the polybutadiene used in Example I in 92.5 parts of styrene containing 0.2 parts of trinonylphenyl phosphite was prepared under a blanket of nitrogen following the procedure of Example I. A 75% portion of this rubber in styrene solution was introduced into a stirred, heated reactor and 0.05 parts of t-dodecyl mercaptan added. The solution was then stirred at 130 rpm at 115° C. for 6 hours until about 33% total solids had been formed in the solution. The average particle size of the rubber at this stage of the polymerization was determined to be about 0.9 micron with maximum particle diameters of 2.4 microns.

Prepolymerization Step B

To the above polymerization mixture was added the remaining 25% portion of the rubber in styrene solution and the agitator speed was reduced to 50 rpm. The addition of this portion of the solution cooled the total mixture to about 95° C. After stirring the mixture for 35 minutes, a mixture having 27.8% solids and an average rubber particle size of 1.6 microns with maximum particle diameters of 5.2 microns was obtained.

Suspension Step

At this point, the mixture was suspended in water as in Example I, 0.1 parts of t-butyl perbenzoate added, and the polymerization completed by heating in suspension for 4 hours at 112° C. followed by 3 hours at 135° C. The resultant graft copolymer of styrene on the butadiene rubber was isolated as in Example I and dried. The dried beads had a bead particle size of between 20 and 60 mesh, U.S. Standard Sieve, and a rubber particle size of about 2.2 microns average with maximum particle size diameter of about 6 microns-a broad range of 3.8 microns.

This example illustrates one embodiment of the invention wherein the rubber particle size distribution is broadened by bulk polymerization of a portion of the rubber in styrene solution, combined with a mixing of the remaining portion of the solution to obtain the desired rubber particle size distribution. In this embodiment, the bulk mixture was not polymerized after the addition of the remainder of the rubber solution until the suspension polymerization step.

EXAMPLE III

The prepolymerization step A of Example II was repeated except that 0.07 parts of t-dodecyl mercaptan was added. The solution was stirred at 140 rpm at 112° C. for 6.5 hours to give 33% total solids. The average particle size of the rubber at this point was less than about 1 micron with maximum particle diameters of 3.0 microns.

Addition of the remaining 25% portion of the rubber in styrene solution cooled the reaction mixture to 92° C. The mixture was stirred at 75 rpm for 30 minutes at that temperature. The rubber particles now had an average particle diameter of 1.2 microns with a maximum particle diameters of 7 microns.

The mixture was then suspended and polymerized to completion as in Example II. The dried beads had a bead particle size of between 20 and 60 mesh and a rubber particle size of about 1.5 microns average with maximum particle size diameters of about 7 microns-a range of 5.5 microns.

EXAMPLE IV

The procedure of Example II was repeated except that a 67% portion of the rubber solution was used in prepolymerization step A and a 33% portion in step B. The product of suspension polymerization had an average rubber particle size of 2 microns with maximum particle diameters of 10 microns-a range of about 8 microns.

Similar results were obtained when the procedure of Example II was repeated using an 80% portion of step A and a 20% portion in Step B.

EXAMPLE V

Prepolymerization Step A

A solution of 5.6 parts of a rubber copolymer of butadiene and styrene containing about 21% styrene in 69.4 parts of styrene containing 0.2 parts of trinonylphenyl phosphite was prepared under a blanket of nitrogen. To this solution was added 0.06 parts of t-dodecyl mercaptan and the mixture was heated at 112° C. for 6.5 hours with 500 rpm agitation until about 34% total solids had been formed.

Prepolymerization Step B

To the above polymerization mixture was added a solution of 1.8 parts of a stereospecific polybutadiene rubber in 23.2 parts of styrene. The resulting mixture was stirred at 225 rpm for about 1 hour at 96° C.

Suspension Step

The prepolymer solution from Step B was suspended and polymerized as in Example II. The resultant polymer had an average rubber particle size of 1 micron with maximum particle diameters of 10 microns—a range of 9 microns.

EXAMPLE VI

A solution of 7.5 parts of the polybutadiene rubber used in Example I in 82.5 parts of styrene and 10 parts of acrylonitrile was prepared under a blanket of nitrogen following the procedures of Example I. A 75% portion of this rubber-in-monomers solution was introduced into a stirred, heated reactor and 0.09 parts of t-dodecyl mercaptan added. The solution was stirred at 450 rpm at 115°–120° C. for 4.25 hours until about 30% solids had formed. Due to refluxing of the acrylonitrile during the later stages of this step, the temperature of the polymerization dropped to 112° C. in the last few minutes.

To the above prepolymer mixture was added the remaining 25% portion of the rubber-in-monomers solution and an additional 0.03 part of the mercaptan modifier. The total system was stirred at 250 rpm for 0.5 hours at 105° C.

At this point, the mixture was suspended in water containing 0.6 part mineral oil and 0.12 part t-butyl perbenzoate, and polymerized to complete conversion. The final polymer beads had an average rubber particle size of about 5.4 microns diameter with maximum particle diameters of about 15 microns-a range of 9.6 microns.

What is claimed is:

1. In a process for making graft copolymers comprising dissolving a rubbery copolymer selected from the group consisting of conjugated 1,3-diene rubbers, styrene-diene copolymer rubbers, acrylonitrile-diene copolymer rubbers, ethylene-propylene-diene terpolymer rubbers, acrylatediene copolymer rubbers, and mixtures thereof, in polymerizable ethylenically unsaturated monomer liquid selected from the group consisting of monovinylaromatic hydrocarbons, unsaturated nitriles, acrylic monomers, and mixtures thereof, to form a rubber solution, partially polymerizing said rubber solution in mass to form a prepolymer, subsequently suspending the prepolymer with additional monomer liquid in aqueous medium, and polymerizing the suspension to complete conversion to form a graft copolymer, the improvement for obtaining the prepolymer comprising:
   a. polymerizing a first portion consisting of a 50 to 85 percent by weight of a total rubber solution by heating at a temperature of 70° to 130° C. in bulk to a conversion of 15 to 40 percent to form a prepolymer having an average rubber particle size of from 0.5 to 3.0 microns diameter; and
   b. adding a second portion consisting of a 15 to 50 percent by weight of a total rubber solution to the prepolymer system and mixing at a lower temperature under conditions to form a prepolymer having an average rubber particle size of from 1.0 to 4.0 microns diameter with a maximum size of 5 to 15 microns diameter; said rubber particle size prepared in step (b) being greater than that prepared in step (a); whereby said prepolymer has a broad distribution of rubber particle sizes having a range of between 3.8 and 11 microns.

2. The process of claim 1 wherein said rubbery polymer is polybutadiene.

3. The process of claim 1 wherein said rubbery polymer is a copolymer of at least 50 mole percent butadiene and the remainder of styrene.

4. The process of claim 1 wherein said unsaturated monomer liquid is styrene.

5. The process of claim 1 wherein said unsaturated monomer liquid is a mixture of styrene and 5 to 20 percent acrylonitrile.

6. The process of claim 1 wherein said first portion of a rubber solution is a solution of from 5 to 15 percent polybutadiene in 85 to 95 percent styrene, and said second portion of a rubber solution is the same rubber solution.

7. The process of claim 1 wherein said first portion of a rubber solution is a solution of 5 to 15 percent of a rubbery copolymer of 65 to 90 percent butadiene and 35 to 10 percent styrene dissolved in 85 to 95 percent styrene, and said second portion of a rubber solution is 5 to 15 percent of polybutadiene dissolved in 85 to 95 percent styrene.

* * * * *